United States Patent Office 3,335,063
Patented Aug. 8, 1967

3,335,063
MULTI-PYROCARBON COATED NUCLEAR FUEL AND POISON PARTICLES AND METHOD OF PREPARING SAME
Walter V. Goeddel, Poway, and Charles S. Luby and Jack Chin, San Diego, Calif., assignors to General Dynamics Corporation, New York, N.Y., a corporation of Delaware
No Drawing. Filed Nov. 18, 1963, Ser. No. 324,176
15 Claims. (Cl. 176—67)

This invention relates generally to a multi-coated shape, and more particularly relates to a multi-coated shape having increased structural stability.

Fuel elements which do not require a metal clad have been found to be desirable for use in high temperature gas cooled nuclear reactors. One function of the clad is to retain condensible fission products within the fuel element. Therefore, fuel elements which do not have a clad preferably employ coated fissionable fuels which retain greater proportions of the condensible fission products within the fuel element. The fission products retentive coating is normally a dense, thermally conductive coating, e.g., pyrolytic carbon, which is of a hard and brittle nature.

Poisons are desirably included within nuclear reactors to control excess reactivity. Additionally, burnable poisons are included within reactor control rods or fuel elements to extend the reactivity lifetime of the fuel element and to decrease the number of control rods required within the reactor. Desirably, the poisons are provided with a vapor pressure retentive coating which prevents vaporization of the poisons at the operating conditions within the reactor.

When poisons having vapor pressure retentive coatings and fissionable fuels having fission products retentive coatings are employed in high temperature nuclear reactors, it has been found that the thermal and irradiation stresses to which the coated fuels and poisons are subjected results in the rupture of the retentive exterior coating, and allows the escape of vaporized poison and fission products.

It is a principal object of the invention to provide multi-coated shapes having increased structural stability. It is an additional object to provide multi-coated shapes having increased structural stability under conditions of thermal and irradiation stress. It is a further object to provide a multi-coated fissionable fuel which has increased stability and increased retention of condensible fission products. It is also an object to provide a fuel element containing a multi-coated fissionable fuel having increased stability and increased retention of condensible fission products. Another object is to provide a multi-coated poison for use in nuclear reactors which has increased structural stability and a decreased rate of vaporization. Yet another object is to provide a method for increasing the structural stability of multi-coated shapes. A still further object is to provide a multi-coated shape which has increased stability under conditions of thermal stress which is convenient and economical to construct.

These and other objects are more particularly set forth in the following detailed description.

Very generally, the present invention relates to a multi-coated shape which has increased structural stability and to a method for manufacturing such a shape. More specifically, the invention relates to a coated article having increased structural stability comprising a core, a low density, spongy, shock absorbing pyrolytic carbon coating capable of absorbing stresses on said core, said spongy, pyrolytic carbon coating being coated with at least two distinct and discontinuous coatings of dense, thermally conductive, pyrolytic carbon, the interface between the dense, pyrolytic carbon coatings forming a barrier preventing the propagation of cracks through the coatings on the core.

The present invention has particular application in the protection of nuclear fuels and poisons, and in particular particulate nuclear fuels and poisons. For purposes of description the invention will be described as applied to nuclear fuels and poisons, although other non-nuclear uses are contemplated.

The use of a dense, thermally conductive coating to improve the condensible fission products retention characteristics of fissionable fuels is known. In connection with this, various coated fissionable fuels, including metals such as uranium, thorium, plutonium and compounds such as uranium dioxide, thorium dioxide, uranium carbide, uranium dicarbide and thorium dicarbide, etc., are known.

Some fissionable fuels undergo reactions with coating materials at reactor operating conditions. Essentially non-reactive carbide and dicarbide fissionable fuels are preferred for use with retentive coatings, but the present invention is not considered to be limited thereto and may also be employed with nuclear fuel oxides as well as with other forms of nuclear fuels. A particular fissionable fuel which has desirable characteristics for use in high temperature nuclear reactors, and which is relatively inert with respect to coating materials, is a dicarbide of a fissionable material, for instance, uranium dicarbide or a mixture of uranium dicarbide and thorium dicarbide. Discrete coated particles or uranium dicarbide or discrete coated particles comprising a mixture of uranium dicarbide and thorium dicarbide have been found to be advantageous for use as a nuclear fuel. A fuel comprising a mixture of uranium dicarbide and thorium dicarbide in which the ratio of thorium to uranium is approximately 10 to 1 has been found to be a desirable ratio for nuclear reactors. Preferably, but not necessarily, the uranium dicarbide-thorium dicarbide mixture contains an excess of carbon to minimize migration of the uranium and/or thorium at high temperatures. Although carbide and dicarbide fuels have good structural characteristics, they are susceptible to hydrolysis when exposed to the atmosphere and do not have satisfactory fission products retention unless they are provided with a retentive coating.

Pyrolytic carbon, which is of a dense, thermally conductive nature, and which has a definite crystallite structure approaching that of graphite has been found to be a desirable fission products retaining coating for fissionable fuels and increases the retention of condensible fission products within the fissionable fuel. A dense, pyrolytic carbon coating also prevents hydrolysis of carbide and dicarbide fuels. A dense, thermally conductive pyrolytic carbon coating similar to that used to retain fission products can also be applied to nuclear poisons which have relatively high vapor pressures, i.e., boron carbide and gadolinium carbide, to prevent the vaporization of the poison at the reactor operating conditions.

The so-called "engineered" fuels and poisons of the past containing various coatings which improve certain characteristics of the fuel particles or poisons are generally superior to uncoated fuels and poisons. However, some of the coatings employed, e.g., dense, thermally conductive, pyrolytic carbon, are brittle in nature and is susceptible to rupturing or cracking during operation at high temperatures. When the retentive, pyrolytic carbon coating becomes ruptured, the retentive characteristics of the coating are greatly diminished resulting in the escape of fission products or the vaporization of the poison. Failure of the brittle coatings can be attribtued to several effects which occur during operation of the reactor at high temperatures. Some effects which are believed to cause failure of the retentive coating are: (1) damage to the coating from fission recoils into the inner surface of the coating which result in the generation and propagation of cracks through the coating; (2) stress generated in the coating from differential thermal or irradiation expansion within the particle and coating which result in the rupture of the coating; and (3) irradiation damage due to neutron bombardment of the exterior surface of the dense, thermally conductive, pyrolytic carbon coating.

The rupture or cracking of the brittle fission products retention coating under conditions of thermal stress may be substantially prevented by the use of a shock absorbing layer of low density, spongy, pyrolytic carbon as described in the co-pending application of Goeddel and Luby, Ser. No. 272,199, filed April 11, 1963, now Patent No. 3,325,363. The spongy, low density, pyrolytic carbon coating absorbs most thermal and irradiation stresses occurring within the fuel or poison and prevents transmission of these stresses to the brittle fission products retentive exterior coating.

The low density, spongy, pyrolytic carbon shock absorbing coating is to be distinguished from the dense, thermally conductive, pyrolytic carbon coatings which form the fission products retentive coatings and the barrier, as hereinafter more fully described. The spongy, pyrolytic carbon coating preferably is applied to the shape to be protected in a manner so as to provide an amorphous carbon coating of the lowest possible density which will adhere to the shape to be protected.

The low density, spongy, pyrolytic carbon coating may be applied to fissionable fuels in a thickness of from about 5 microns to about 50 microns and is preferably applied in a thickness of approximately one to two fission "recoil ranges." A "recoil range" is the range or distance of travel of the fission products within a given material, e.g., spongy carbon. Spongy carbon has a "recoil range" of 12–25 microns, depending on density and the coating is preferably applied in a thickness of about 25 to 50 microns. It has been found that when the spongy carbon coating has a thickness of approximately two recoil ranges, it will absorb nearly all of the fission recoils and will substantially prevent the fission recoils from striking and rupturing the brittle, dense fission products retentive pyrolytic carbon coatings.

A spongy, pyrolytic carbon coating of approximately the same thickness, that is, from 12 to 50 microns, will also prevent the transmittal of thermal and irradiation stresses to the brittle, dense, pyrolytic carbon coatings. The use of a low density, spongy, pyrolytic carbon coating has also been found to reduce or eliminate the rupture of the dense, thermally conductive coatings on fuel particles due to the thermal stress effects which occur in fuel particles which are employed in high temperature reactors.

The low density, spongy, pyrolytic carbon coating may be applied to the fissionable fuel or to the burnable poison in a manner similar to that described for the coating of the fuel or poison with the distinct and discontinuous dense, thermally conductive, pyrolytic carbon coatings. In this connection, the fuel particles or poison particles may be dispersed as a fluid bed in a stream of helium and heated to a temperature between about 800° C. to about 1400° C. A substance which is capable of producing low density, spongy, pyrolytic carbon upon decomposition, e.g., acetylene gas, at a relatively high partial pressure, e.g., between about 0.65 to about 0.90 atmosphere, is mixed with the stream of helium gas. Alternately, other materials which provide low density, spongy, pyrolytic carbon upon decomposition may be employed. At temperatures above 800° C. the acetylene gas decomposes upon the surface of the particles and forms a low density, spongy, pyrolytic carbon coating on the surface thereof. When the desired thickness of low density, spongy carbon, e.g., 5 to 50 microns, has been deposited upon the surface of the particles, the flow of acetylene gas is terminated.

The multi-coated fuels or poisons which are provided with an inner spongy, shock absorbing coating as described in the aforementioned application are effective to substantially reduce rupturing and cracking of the brittle, dense, pyrolytic carbon outer coating on the fuel. However, it has been discovered that when a small rupture is nevertheless formed in the inner or outer surface of the dense, pyrolytic carbon coating, either from excessive internal thermal shock or fission recoil, or from external irradiation bombardment, the rupture rapidly propagates through the coating thus forming a crack in the retentive coating which allows the escape of fission products.

It has been discovered that if the multi-coated fuel or poison having a low density, spongy pyrolytic carbon inner coating is provided with a barrier in the dense outer pyrolytic carbon coating, a rupture which may form in either the interior or exterior surface of the brittle, dense, pyrolytic carbon outer coating will be prevented from forming a crack through which fission products may escape. Further, it has been discovered that the multi-coated fuel may be provided with a barrier formed by a plurality of dense, thermally conductive, pyrolytic carbon coatings which are co-jointly utilized as the fission products retentive coating.

A fuel or poison may be provided with a barrier by coating a core having a low density, spongy pyrolytic carbon inner coating with at least two distinct and discontinuous dense, thermally conductive, pyrolytic carbon coatings. The interface between the distinct and discontinuous pyrolytic carbon coatings acts as a barrier and halts the propagation of ruptures through the coatings and the formation of cracks which allow escape of fission products. As used herein, the term "distinct and discontinuous" means coatings which are not cohesively bonded to one another. Preferably, the distinct and discontinuous coatings are formed in a manner so that they have differing crystallite structures.

The formation of a barrier at the interface between distinct dense, pyrolytic carbon coatings is believed to be due to the interruption in the molecular arrangement of the pyrolytic carbon coatings.

A rupture propagates through pyrolytic carbon due to severance of the molecular bonds in the crystallite structure of the pyrolytic carbon. When the rupture has propagated through one of the dense pyrolytic carbon coatings, it reaches the barrier formed by the interface of the adjacent distinct and discontinuous pyrolytic carbon coating. Since the two coatings are not cohesively bonded, to an isotropic structure wich is relatively random and propagation of the rupture is halted before a crack is formed which would allow escape of fission products.

Distinct and discontinuous pyrolytic carbon coatings may be formed in various ways. For example, after one pyrolytic carbon coating has been applied, the coated particles may be cooled to a lower temperature, e.g., 1000° C., at which temperature the methane gas will not appreciably decompose. The cooled particles are then reheated to the original temperature of deposition. Due to cooling of the coated particles, the second dense, thermally conductive, pyrolytic carbon coating will be distinct and discontinuous from the first coating, and the interface between the coatings will provide a barrier which halts propagation of ruptures in the coatings. Also, distinct and discontinuous coatings can be formed by interrupting the flow of methane after a first coating has been obtained, then re-introducing the methane into the reaction tube at its original partial pressure to obtain a second coating. If desired, both cooling of the particle and interruption of the methane flow can be used to form the discontinuous second coating. Thus distinct and discontinuous dense pyrolytic coatings deposited under the same temperature and methane partial pressure conditions can be obtained with an interface between the coatings to provide a barrier which halts propagation of ruptures in the coating. Furthermore, after the particles have been provided with a first dense, thermally conductive, pyrolytic carbon coating, the particle temperature and/or partial pressure of the methane may be altered and a second dense, thermally conductive, pyrolytic carbon coating applied. By altering the conditions of deposition, the second pyrolytic carbon coating that is formed is distinct and discontinuous from the first coating.

It is generally preferable to apply the distinct and discontinuous coatings of dense, thermally conductive, pyrolytic carbon in a manner so as to insure that the crystallite structure of the different coatings are not identical. In this connection, the distinct and discontinuous coatings are desirably applied to the fuel or poison so that at least one coating can be considered "laminar" and at least one coating can be considered "columnar." As used herein, the term "laminar" defines the crystallite structure of a dense pyrolytic carbon coating wherein the structure may vary from an anisotropic form having layers parallel or tangential to the surface of the core, to an isotropic structure which is relatively random and featureless, when the coatings are viewed metalographically under polarized light. The term "columnar" defines the crystallite structure of a dense pyrolytic carbon coating wherein the structure shows distinct and identifiable metallographic grain boundaries under polarized light. Under a bright field, as opposed to polarized light, "laminar" coatings are generally featureless, while the "columnar" coatings show identifiable crystallite features.

It can be seen that if at least one of the distinct and discontinuous dense, thermally conductive, pyrolytic carbon coatings is laminar, and at least one of the dense, thermally conductive, pyrolytic carbon coatings is columnar, an interface between adjacent coatings will be formed wherein the coatings are not well bonded and, under ordinary circumstances, the propagation of substantially all ruptures which are formed in the coatings will be halted by the barrier provided by the interface. Either a laminar coating or a columnar coating may be utilized as the outermost coating on the fuel or poison.

The distinct and discontinuous, dense, thermally conductive, pyrolytic carbon coatings may be applied over the low density, spongy, pyrolytic carbon coating on the core of fissionable material or poison in any convenient manner. For example, uranium dicarbide-thorium dicarbide particles or boron carbide particles may be dispersed as a fluid bed in a stream of heated helium gas within a heated graphite reaction tube at a temperature between about 1200° C. to 2200° C. A substance which is capable or producing dense, thermally conductive, pyrolytic carbon upon decomposition, e.g., methane, is mixed with steam of helium at a partial pressure of approximately 0.001 to 0.80 atmosphere. Any other material which produces dense, thermally conductive, pyrolytic carbon upon decomposition may also be employed. At temperatures in excess of 1200° C. the methane gas decomposes upon the surface of the particles and forms a pyrolytic carbon coating on the surface of the particles. The pyrolytic carbon coatings may be of any desired thickness, e.g., from 10 to 80 microns each, which is sufficient to retain fission products within the fuel particles or to prevent the vaporization of the poison.

Further, it has been found that if the partial pressure of the methane is maintained between 0.08 and 0.80 atmosphere at a total gas flow through a one inch diameter reactor of 1000 to 10,000 cubic centimeters per minute, the dense, thermally conductive, pyrolytic carbon coating will be laminar. However, if the partial pressure of the methane is reduced to between about 0.001 to about 0.08 atmospheres, the coating will be columnar.

The particular operating conditions for forming the dense, pyrolytic carbon coatings, whether laminar or columnar, can be varied as desired in order to provide dense, pyrolytic carbon coatings. The geometry of the reaction tube and the size and shape of the articles which are to be coated are determinative of the flow rate and partial pressure of the gases.

Example 1

A particulate uranium dicarbide-thorium dicarbide fissionable fuel mixture is prepared from a mixture of powdered thorium dioxide, powdered uranium dioxide and powdered carbon. The uranium dioxide employed is of the enriched variety, containing 91 percent to 93 percent of $U^{235}$. Ten grams of thorium dioxide, containing 88 percent thorium, is admixed with each gram of uranium dioxide in order to provide a fissionable uranium dicarbide-thorium dicarbide fuel having a 10 to 1 thorium to uranium ratio. Carbon is added in an amount in excess of the stoichiometric amount required for conversion of the dioxides to dicarbides and a binder of 2 percent by weight of ethyl cellulose is added to the mixture of dioxides and carbon.

The powdered thorium dioxide, uranium dioxide, carbon and ethyl celulose is intimately combined together while dry, and a trichloroethylene solvent for the ethyl cellulose binder is added to dissolve the ethyl cellulose and form a slurry. The slurry is agitated to obtain agglomerated particles of thorium dioxide, uranium dioxide and carbon of a size of about 295 to 500 microns which are oven dried at 140° F. The dried agglomerated particles of thorium dioxide, uranium dioxide and carbon are mixed together with graphite flour, e.g., graphite having an average particle size of less than 20 microns, in a particle to graphite weight ratio of 8 to 1, and are reacted in a graphite crucible under vacuum at a temperature of 2200° C. to reduce the dioxide to dicarbides. The presence of an excess amount of carbon causes the formation of a solid solution of a eutectic of thorium dicarbide, uranium dicarbide and carbon rather than stoichiometric dicarbides. After the dioxides have been completely reduced to dicarbides the temperature is raised to 2500° C. to melt and densify the particles of uranium dicarbide-thorium dicarbide. The presence of the graphite flour prevents coalescence of the uranium dicarbide-thorium dicarbide particles which are maintained as dispersed particles by the graphite flour. Upon cooling, dense, nearly spherical particles, of a size of 175 microns to 300 microns, of a solid solution of uranium dicarbide and thorium dicarbide are obtained.

A graphite reaction tube one inch in diameter is heated to 1150° C. and helium gas is passed through the tube at a flow rate of 3800 cubic centimeters per minute. 50 grams of the uranium dicarbide-thorium dicarbide fissionable fuel of a particle size of 175 microns to 300 microns, is dropped into the reaction tube and fluidized in the helium gas stream. When the temperature of the fuel particles reaches 1150° C., acetylene gas, at a partial pressure of 0.80 atmosphere is admixed with the helium gas stream. The acetylene gas decomposes and deposits low density, spongy carbon upon the fuel particles. The acetylene gas flow is continued until a low density, spongy, carbon coating of 25 microns is deposited upon the fuel particles. The acetylene gas flow is terminated and the temperature of the reaction tube is raised to 1700° C. At this temperature methane gas, at a partial pressure of 0.18 atmosphere, is admixed with the helium gas and passed into the reaction tube where it decomposes to deposit an intermediate dense, thermally conductive, laminar, pyrolytic carbon coating over the spongy carbon coating. The methane gas flow is continued until a laminar, pyrolytic carbon coating of a thickness of 30 microns is obtained.

The flow of methane gas is terminated and the temperature of the particles is increased to 1850° C. A further amount of methane gas at a partial pressure of 0.025 atmospheres is admixed with the helium gas and passed into the reaction tube where it decomposes to deposit a dense, thermally conductive, columnar, pyrolytic carbon coating on the intermediate laminar, pyrolytic carbon coating. The methane gas flow is continued until a columnar, pyrolytic, carbon coating of a thickness of 45 microns is obtained at which time the methane gas flow is terminated and the coated fuel particles are cooled in helium and removed from the reaction tube.

The coated fuel particles have substantially improved fission products retention. The Xenon-133 release fraction after 50 hours at 1700° C. of the coated particles of Example I is within the range of $1 \times 10^{-6}$ to $5 \times 10^{-5}$ cm.$^2$. The coated fuel particles of Example I also show improved irradiation stability, and after 20 percent burnup of the fissionable fuel show no coating failures are observed.

*Example II*

Fuel particles having a distinct and discontinuous, dense, thermally conductive, pyrolytic, carbon coatings are manufactured in accordance with Example I except that the columnar, pyrolytic, carbon coating is applied as an intermediate coating and the laminar pyrolytic carbon coating is applied as the outer coating. The fuel particles have equivalent fission products retention and irradiation stability to the fuel particles of Example I and are considered to be identical for all purposes.

*Example III*

Boron carbide poison particles having an average size of approximately 20 microns are provided with a low density, shock absorbing, spongy, carbon coating, an intermediate, dense, thermally conductive, laminar pyrolytic, carbon coating and an outer dense, thermally conductive, columnar pyrolytic carbon coating in accordance with the method of Example I. The coated boron carbide particles show increased resistance to thermal and irradiation stresses and have increased vapor pressure retention.

A fissionable fuel or poison which has been coated with a shock absorbing layer of low density, spongy, pyrolytic carbon, and at least two distinct and discontinuous dense, thermally conductive, pyrolytic carbon coatings may be incorporated within various fuel elements for use in nuclear reactors. The fuel elements can be either self-purged or force-purged as may be desired. However, the fission product retention characteristics and the improved resistance to cracking of fission products retentive coating makes the fuel desirable for use in self-purged fuel elements.

The coated fuel can be employed within the fuel element in any shape that is found to be convenient. In conjunction with this, discrete particles of a fissionable fuel coated with a protective, shock absorbing layer of low density, spongy, pyrolytic carbon and at least two distinct and discontinuous, dense, thermally conductive, pyrolytic carbon coatings have been found to be desirable. The coated fuel particles may be dispersed in a graphite matrix and compressed into fuel compacts, or may be employed in the form of a packed bed of discrete particles as described in the co-pending application of Stanley L. Koutz, Ser. No. 257,989, filed Feb. 12, 1963, now Patent No. 3,252,869 and assigned to the assignee of the present invention. The fuel particles can be dispersed in a graphite matrix using pitch as a binder by mixing the coated fuel particles and powdered graphite in a blender, adding pitch dissolved in trichloroethylene solvent to form a paste, spreading the paste in a thin sheet which is diced and dried. The dried paste is warm pressed at 750° C. and 4000 p.s.i. to form a fuel compact. The compact can then be heat treated to stabilize the compact dimensions.

Although the invention has been particularly described with respect to a fissionable fuel of uranium dicarbide or a mixture of uranium dicarbide and thorium dicarbide and to a burnable poison of boron carbide and gadolinium carbide, it is understood that other fissionable materials and other poisons can be provided with a protective coating of low density, spongy, pyrolytic carbon and at least two distinct and discontinuous dense, thermally conductive, pyrolytic carbon coatings to provide improved structural stability and fission products or vapor pressure retention. Likewise, various shaped fissionable fuel bodies can be provided with these coatings, and although a particulate fissionable fuel has been described, it is intended that the coatings may be applied to other shapes such as rods, compacts, annuluses, etc. Further, although the use of a low density, spongy, inner pyrolytic carbon coating and distinct and discontinuous dense, thermally conductive, pyrolytic carbon outer coatings are particularly suited for application to materials employed in nuclear reactors, it is not intended that the invention be limited thereto. For example, a catalyst which has a brittle exterior coating may be provided with a protective low density, spongy, pyrolytic carbon coating and distinct and discontinuous dense, thermally conductive, pyrolytic carbon coatings to improve its stability at high temperatures.

It can be seen that a means has been provided for increasing the structural stability of shapes subjected to thermal stress. Additionally, a fissionable fuel having increased stability and fission products retention characteristics has been provided. Fissionable fuels having a coating of a shock absorbing low density, spongy, pyrolytic carbon and at least two distinct and discontinuous dense, thermally conductive, pyrolytic carbon coatings are suitable for use in high temperature reactors, and may be employed within fuel elements in the form of particles dispersed in a graphite matrix or in the form of a packed bed of discrete particles. A nuclear poison having increased vapor pressure retention and structural stability has also been provided.

Various of the features of the invention are set forth in the following claims.

We claim:
1. A multi-coated article for use in a reactor core having increased structural stability comprising, a core, a low density, spongy shock absorbing pyrolytic carbon coating capable of absorbing stresses on said core, said spongy pyrolytic carbon coating being coated with at least two distinct and discontinuous coatings of dense, thermally conductive pyrolytic carbon, the interface between said distinct and discontinuous dense pyrolytic carbon coatings forming a barrier which prevents the propagation of cracks through said dense pyrolytic carbon coatings.

2. A multi-coated nuclear fuel having increased structural stability comprising, a core of fissionable material, a low density, spongy shock absorbing pyrolytic carbon coating capable of absorbing stresses on said core, said spongy pyrolytic carbon coating being coated with at least two distinct and discontinuous coatings of dense thermally conductive pyrolytic carbon, the interface between said distinct and discontinuous dense pyrolytic carbon coatings forming a barrier which prevents the propagation of cracks through said dense pyrolytic carbon coatings and prevents the release of fission products.

3. A multi-coated article for use in a reactor core having increased structural stability comprising, a core, a low density, spongy shock absorbing pyrolytic carbon coating capable of absorbing stresses on said core, an intermediate dense, thermally conductive pyrolytic carbon coating on said spongy coating, and a distinct and discontinuous outer dense, thermally conductive pyrolytic carbon coating on said intermediate coating.

4. A multi-coated nuclear fuel having increased structural stability comprising, a core of fissionable material, a low density, spongy pyrolytic carbon coating capable of absorbing fission recoils on said core, an intermediate dense, thermally conductive pyrolytic carbon coating on said spongy coating, and a distinct and discontinuous outer dense, thermally conductive pyrolytic carbon coating on said intermediate coating.

5. A multi-coated nuclear fuel having increased structural stability comprising, a core of fissionable material, a low density, spongy pyrolytic carbon coating capable of absorbing fission recoils on said core, said spongy pyrolytic carbon coating having a thickness between about 5 microns and about 50 microns, an intermediate dense, thermally conductive pyrolytic carbon coating on said spongy coating, said intermediate coating having a thickness between about 10 microns and about 80 microns, and a distinct and discontinuous outer dense, thermally conductive pyrolytic carbon coating on said intermediate coating, said outer coating having a thickness between about 10 microns and about 80 microns.

6. A multi-coated nuclear fuel having increased structural stability comprising, a core of fissionable material, a low density, spongy pyrolytic carbon coating capable of absorbing fission recoils on said core, an intermediate dense, thermally conductive, laminar pyrolytic carbon coating on said spongy coating, and a distinct and discontinuous outer dense, thermally conductive, columnar pyrolytic carbon coating on said intermediate coating.

7. A multi-coated nuclear fuel having increased structural stability comprising, a core of fissionable material, a low density, spongy pyrolytic carbon coating capable of absorbing fission recoils on said core, said spongy pyrolytic carbon coating having a thickness between about 5 microns and about 50 microns, an intermediate dense, thermally conductive, laminar pyrolytic carbon coating on said spongy coating, said intermediate coating having a thickness between about 10 microns and about 80 microns, and a distinct and discontinuous outer dense, thermally conductive, columnar pyrolytic carbon coating on said intermediate coating, said outer coating having a thickness between about 10 microns and about 80 microns.

8. A multi-coated nuclear fuel having increased structural stability comprising, a core of fissionable material selected from the group consisting of uranium dicarbide and mixtures of uranium dicarbide and thorium dicarbide, a low density, spongy pyrolytic carbon coating capable of absorbing fission recoils on said core, said spongy pyrolytic carbon coating having a thickness between about 5 microns and about 50 microns, an intermediate dense, thermally conductive pyrolytic carbon coating on said spongy coating, said intermediate coating having a thickness between about 10 microns and about 80 microns and a distinct and discontinuous outer dense, thermally conductive pyrolytic carbon coating on said intermediate coating, said outer coating having a thickness between about 10 microns and about 80 microns.

9. A multi-coated nuclear fuel having increased structural stability comprising, discrete particles of fissionable material selected from the group consisting of uranium dicarbide and mixtures of uranium dicarbide and thorium dicarbide, a low density, spongy pyrolytic carbon coating capable of absorbing fission recoils on said particles, said spongy pyrolytic carbon coating having a thickness between about 5 microns and about 50 microns, an intermediate dense, thermally conductive pyrolytic carbon coating on said spongy coating, said intermediate coating having a thickness between about 10 microns and about 80 microns, and a distinct and discontinuous outer dense, thermally conductive pyrolytic carbon coating on said intermediate coating, said outer coating having a thickness between about 10 microns and about 80 microns.

10. A multi-coated nuclear fuel having increased structural stability comprising, discrete particles of fissionable material selected from the group consisting of uranium dicarbide and mixtures of uranium dicarbide and thorium dicarbide, a low density, spongy pyrolytic carbon coating capable of absorbing fission recoils on said particles, said spongy pyrolytic carbon coating having a thickness between about 5 microns and about 50 microns, an intermediate dense, thermally conductive, laminar pyrolytic carbon coating on said spongy coating, said intermediate coating having a thickness between about 10 microns and about 80 microns, and a distinct and discontinuous outer dense, thermally conductive, columnar pyrolytic carbon coating on said intermediate coating, said outer coating having a thickness between about 10 microns and about 80 microns.

11. A multi-coated poison for use in a nuclear reactor having increased structural stability comprising, a core of poison, a low density, spongy shock absorbing pyrolytic carbon coating capable of absorbing stresses on said core, said spongy pyrolytic carbon coating being coated with at least two distinct and discontinuous coatings of dense thermally conductive pyrolytic carbon, the interface between said distinct and discontinuous dense pyrolytic carbon coatings forming a barrier which prevents the propagation of cracks through said dense pyrolytic carbon coatings and prevents the vaporization of said poison.

12. A multi-coated poison for use in a nuclear reactor having increased structural stability comprising, discrete particles of poison, a low density, spongy pyrolytic carbon coating capable of absorbing fission recoils on said particles, said spongy pyrolytic carbon coating having a thickness between about 5 microns and about 50 microns, an intermediate dense, thermally conductive pyrolytic carbon coating on said spongy coating, said intermediate coating having a thickness between about 10 microns and about 80 microns, and a distinct and discontinuous outer dense, thermally conductive pyrolytic carbon coating on said intermediate coating, said outer coating having a thickness between about 10 microns and about 80 microns.

13. A fuel element for use in a nuclear reactor comprising, a graphite body having a bore therein, a fissionable fuel disposed in said bore, said fissionable fuel comprising discrete particles of fissionable material dispersed in a graphite matrix, said particles having an innermost coating of low density, spongy pyrolytic carbon capable of absorbing fission recoils and thermal stresses occurring in said particles, and plural fission product retentive coatings on said spongy coating which include at least two distinct and discontinuous coatings of dense, thermally conductive pyrolytic carbon, the interface between said distinct and discontinuous dense, thermally conductive pyrolytic carbon coatings forming a barrier which prevents the propagation of cracks through said fission products retentive coatings and prevents the escape of fission products.

14. A fuel element for use in a nuclear reactor comprising, a graphite body having a bore therein, a plurality of discrete particles of a fissionable material disposed in said bore selected from the group consisting of uranium carbide and a mixture of uranium carbide and thorium carbide, said particles having an innermost coating of low density, spongy pyrolytic carbon capable of absorbing fission recoils and thermal stresses occurring in said particles, and plural fission product retentive coatings on said spongy coating which include at least two distinct and discontinuous coatings of dense, thermally conductive pyrolytic carbon, the interface between said distinct and discontinuous dense, thermally conductive pyrolytic carbon coatings providing a barrier which prevents the propagation of cracks through said fission products retentive coatings and prevents the escape of fission products.

15. The method of protecting a member selected from the class consisting of discrete particles of a nuclear fuel and discrete particles of a poison for use in a nuclear reactor that are coated with dense retentive pyrolytic carbon coatings, which method comprises depositing on said particles a low density, spongy pyrolytic carbon coating having a thickness sufficient to absorb thermal stresses and fission recoils occurring in said particles, depositing on said spongy pyrolytic carbon coating a first dense, thermally conductive pyrolytic carbon coating, interrupting the deposition of said first pyrolytic carbon coating, and thereafter depositing a distinct and discontinuous dense, thermally conductive second pyrolytic carbon coating on said first pyrolytic carbon coating, the interface between said first and second pyrolytic carbon coatings forming a barrier which prevents the propagation of cracks through both of said coatings.

References Cited

UNITED STATES PATENTS

| 3,089,785 | 5/1963 | Lewis et al. | 176—91 |
| 3,135,665 | 5/1964 | Koutz et al. | 176—90 |
| 3,151,037 | 9/1964 | Johnson et al. | 176—67 |
| 3,243,349 | 3/1966 | Goeddel | 176—67 |
| 2,247,008 | 4/1966 | Finicle | 176—67 X |
| 3,284,549 | 11/1966 | Ford et al. | 176—67 X |
| 3,306,825 | 2/1967 | Finicle | 176—67 |

OTHER REFERENCES

A.E.C. Document, BMI–1624 (Del.), March, 1963, pages L–7 to L–10.

A.E.C. Document, BMI–1628, April 1963, pages 1–7.

Reactor Core Materials, "Coated Particles", vol. 4, No. 2, May 1961, page 59.

CARL D. QUARFORTH, *Primary Examiner.*

L. DEWAYNE RUTLEDGE, *Examiner.*

J. V. MAY, M. J. SCOLNICK, *Assistant Examiners.*

UNITED STATES PATENT OFFICE
CERTIFICATE OF CORRECTION

Patent No. 3,335,063                      August 8, 1967

Walter V. Goeddel et al.

It is hereby certified that error appears in the above numbered patent requiring correction and that the said Letters Patent should read as corrected below.

Column 4, line 52, for "to an isotropic structure wich is relatively random" read -- the surface of the adjacent coating is not ruptured --; column 5, line 55, for "steam" read -- the stream --.

Signed and sealed this 6th day of August 1968.

(SEAL)
Attest:

Edward M. Fletcher, Jr.                    EDWARD J. BRENNER
Attesting Officer                        Commissioner of Patents